United States Patent [19]

Durant

[11] 4,264,496
[45] Apr. 28, 1981

[54] CONCENTRATED AQUEOUS SOLUTIONS OF CATIONIC COLORANT AND PROCEDURE FOR THEIR PREPARATION

[75] Inventor: Marcel Durant, Mont Saint Aignan, France

[73] Assignee: Produits Chimiques Ugine Kuhlmann, Courbevoie, France

[21] Appl. No.: 94,615

[22] Filed: Nov. 15, 1979

[30] Foreign Application Priority Data

Nov. 30, 1978 [FR] France ............................ 78 33782
Feb. 13, 1979 [FR] France ............................ 79 03588

[51] Int. Cl.$^3$ ............................................ C09B 29/22
[52] U.S. Cl. ........................................................ 260/157
[58] Field of Search ........................................... 260/157

[56] References Cited

U.S. PATENT DOCUMENTS

| | | | |
|---|---|---|---|
| 3,438,963 | 4/1969 | Robbins | 260/157 |
| 3,770,716 | 11/1973 | Ozutsumi et al. | 260/157 X |
| 4,048,151 | 9/1977 | Henzi | 260/157 X |
| 4,051,117 | 9/1977 | Kühlthau et al. | 260/157 X |
| 4,063,889 | 12/1977 | Kissa | 8/168 C |

FOREIGN PATENT DOCUMENTS

| | | | |
|---|---|---|---|
| 1526595 | 4/1968 | France | 260/157 X |
| 1583043 | 10/1969 | France | 260/157 X |
| 2081788 | 12/1971 | France | |
| 2290479 | 6/1976 | France | |
| 470464 | 5/1969 | Switzerland | 260/157 X |

*Primary Examiner*—Paul F. Shaver
*Attorney, Agent, or Firm*—Beveridge, DeGrandi, Kline & Lunsford

[57] ABSTRACT

The present invention provides concentrated aqueous acid solutions of the colorant having the formula:

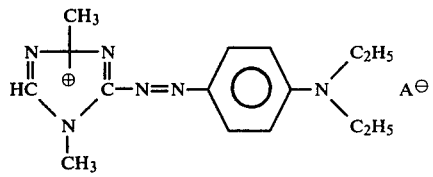

in which $A^\ominus$ represents the formate, acetate or propionate anion. The solutions are prepared starting with the corresponding chloride or sulfomethylate by forming the m- or p-nitrobenzoate, dissolving said salt in formic, acetic or propionic acid and eliminating the nitrobenzoic acid which is precipitated. The solutions of the invention can be used for coloring and printing fibers containing acid groups, and particularly acrylic fibers.

13 Claims, No Drawings

CONCENTRATED AQUEOUS SOLUTIONS OF CATIONIC COLORANT AND PROCEDURE FOR THEIR PREPARATION

The present invention relates to new concentrated aqueous solutions of cationic colorant which can be used for dyeing or printing fibers having acid groups, and especially acrylic fibers, and with a procedure for their preparation.

The development of the coloring of acrylic fibers, and primarily the development of techniques of applying them in a continuous manner, leads to more and more utilization of concentrated solutions of cationic colorants. Therefore, the preparation of stable concentrated solutions which do not precipitate or become cloudy when they are preserved or when they are mixed with each other is of great interest. The mixing of concentrated solutions of different preparations or from diverse sources often results in an incompatibility which produces a change in the form of the solution, either by the precipitation of one of the constituents or by the gelling of the solution, and that change in form makes the solution unsuitable for the use to which it was intended to be put.

This incompatibility is often encountered when there are used concentrated solutions of the colorant having the formula:

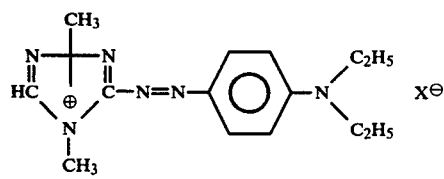

where $X^{\ominus}$ represents an anion. This colorant is known in the chloride, sulfomethylate, chlorozincate and tetrafluoroborate forms.

Thus, mixing of 80 parts by weight of an acid aqueous solution of a colorant having the general formula:

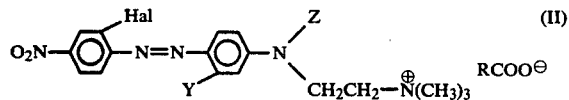

in which Hal represents an atom of chlorine or bromine, Y is an atom of hydrogen or a methyl radical, Z is a methyl or ethyl radical and R is an atom of hydrogen or a methyl or ethyl radical, with 20 parts by weight of a concentrated solution of the colorant of formula (I) wherein $X^{\ominus}$ is the chloride, sulfomethylate, chlorozincate or tetrafluoroborate anion, results in the precipitation of the colorant of formula (II).

In the same way, mixing of 90 parts by weight of an acid aqueous solution of the colorant having the formula:

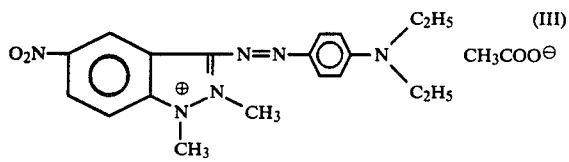

with 10 parts by weight of a concentrated solution of the colorant of formula (I) wherein $X^{\ominus}$ is the chloride, sulfomethylate, chlorozincate or tetrafluoroborate anion, results in the precipitation of the colorant of formula (III).

It has now been found that concentrated solutions of the colorant of formula (I) in which $X^{\ominus}$ is the $HCOO^{\ominus}$, $CH_3COO^{\ominus}$ or $CH_3CH_2COO^{\ominus}$ anion do not have the above-described disadvantages.

Preparation of the formates, acetates or propionates of certain basic colorants is known. The process makes use of the isolation of the base, the hydroxide, the carbonate or the bicarbonate of the colorant and then placing the isolated product into solution in formic, acetic or propionic acid. However, this technique is not suitable in the case of the colorant of formula (I), since the isolation of that colorant in one of the aforementioned forms cannot be carried out because of the instability or the excessive solubility of the products which are formed.

it has been discovered, unexpectedly, that a concentrated solution of the formate, acetate or propionate of colorant (I) can be prepared by precipitating the m- or p-nitrobenzoate of the colorant, then dissolving the precipitate obtained in formic, acetic or propionic acid. The m- or p-nitrobenzoic acid precipitated is then separated by filtration. In this way, there is obtained a concentrated aqueous acid solution of formate, acetate or propionate of colorant (I).

This result is more especially surprising since, while it is known that a weak acid can be displaced from its salts by a strong acid, it could not be foreseen that such displacement could be brought about quantitatively by a weaker acid. Also, such procedure cannot be made to apply generally to the other basic colorants.

Thus, the object of the invention is a process for preparing aqueous concentrated solutions of the colorant having the formula:

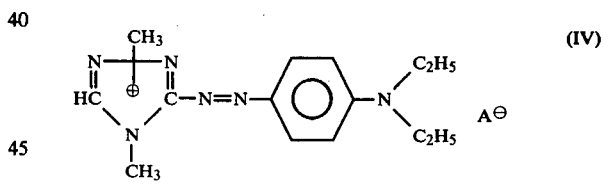

wherein $A^{\ominus}$ represents the formate, acetate or propionate anion, which process comprises forming and isolating, intermediately, the m- or p-nitrobenzoate of the colorant and then dissolving said nitrobenzoate in formic, acetic or propionic acid and separating the m- or p-nitrobenzoic acid which has precipitated.

Preferably, the paranitrobenzoic acid is used as the nitrobenzoic acid for economic reasons. The precipitation of the nitrobenzoate is accomplished starting with concentrated aqueous solutions of the chloride or, preferably, of the sulfomethylate of colorant (I). These solutions can be obtained by the usual methods, and specifically those described in French Pat. Nos. 1,145,751 and 2,081,788.

The process of the present invention is preferably carried out in the following manner:

An aqueous solution of m- or p-nitrobenzoic acid containing from 30 to 120 g of nitrobenzoic acid per liter of water, and preferably from 50 to 100 g per liter of water, is poured into a concentrated aqueous solution of the chloride or sulfomethylate of colorant (I) containing from 0.5 to 1.1 mole of colorant per kg of solution, and preferably from 0.7 to 1 mole per kg.

The quantity of nitrobenzoic acid used can vary from 0.4 to 1 kg, and it is preferably from 0.5 to 0.8 kg per mole of colorant (I).

When the precipitation of the nitrobenzoate is completed, the pH should be between 4.5 and 6, and preferably between 5 and 5.5. An advantageous method of operating consists of dissolving the nitrobenzoic acid in the water by the addition of sodium hydroxide and then lowering the pH to about 6 by the addition of an organic acid, preferably the acid of the desired salt. The acidity of the concentrated solutions of the colorant (I) is then sufficient to obtain the desired pH.

The precipitated nitrobenzoate is isolated by filtration to obtain a paste of nitrobenzoate containing 30% to 60% and preferably between 40% and 50% solids. The paste is dissolved in formic, acetic or propionic acid, depending upon the desired anion. The quantity of acetic, propionic or formic acid can vary from 5 to 18 moles per mole of colorant involved, and preferably from 8 to 12 moles.

After the colorant has been dissolved, possibly assisted by slight heating (temperature lower than 60° C.), the nitrobenzoic acid is precipitated by cooling to a temperature between −5° and +5° C., and preferably between −3° and 0° C. After the mixture is filtered to eliminate the nitrobenzoic acid which is precipitated, which can be reused in a subsequent operation, there is obtained an acid aqueous solution of colorant (IV).

By using the process of the invention it is now possible to prepare concentrated aqueous solutions containing from 2.5 to 9 moles of formic, acetic or propionic acid and from 0.4 to 0.8 mole of colorant (IV) per kg of solution.

These concentrated solutions are stable and can be used for the coloring of fibers bearing acid groups, principally acrylic fibers.

They can also be diluted by the addition of other aliphatic carboxylic acids such as butyric acid and/or aliphatic alcohols containing from 1 to 4 carbon atoms such as methyl, ethyl, propyl, isopropyl, butyl and isobutyl alcohols and/or coloring or printing additives such as polyalcohols soluble in water, their ethers or their esters.

In admixture with the solutions of colorants (II) and (III) the concentrated solutions of the invention give solutions which remain clear even after being stored at 0° C. for 10 days, and that period is very much longer than is necessary industrially for making use of mixtures of concentrated solutions in coloring or printing operations.

The following examples, in which the proportions and percentages are expressed by weight, illustrate the invention without limiting it.

EXAMPLE 1

13.8 parts of paranitrobenzoic acid are dissolved in 180 parts of water by the addition of 10.3 parts of an aqueous solution of sodium hydroxide at 35° Be. The pH of the resulting solution is adjusted to 6 by the addition of 7 parts of 10% acetic acid. The solution of paranitrobenzoic acid obtained in this way is then introduced, over one hour, into 33.5 parts of a solution of sulfomethylate of colorant (I) containing 0.7 mole of colorant per kg. After agitating for two hours, the paranitrobenzoate which has precipitated is isolated by filtration. 37 parts of paste with 42% solids content are obtained.

The paste is dissolved in 12.7 parts of glacial acetic acid by heating to 50° C. and stirring for one hour. After cooling to −2° C. and then filtering, 38 parts of a solution of the acetate of colorant (IV) containing 0.5 mole of colorant per kg is obtained. The yield is 81%.

EXAMPLE 2

The operation is as in Example 1, with the exception that the paranitrobenzoic acid is replaced by metanitrobenzoic acid. The same result is obtained.

EXAMPLE 3

13.8 parts of paranitrobenzoic acid are dissolved in 180 parts of water by the addition of 10.3 parts of an aqueous solution of sodium hydroxide at 35° Be. The pH of the resultant solution is adjusted to 6 be the addition of 0.7 part of 80% formic acid. The solution of p-nitrobenzoic acid obtained is then introduced, over one hour, into 36.4 parts of a solution of the sulfomethylate of colorant (I) containing 0.65 mole of colorant per kg. After agitating for two hours, the paranitrobenzoate which has precipitated is isolated by filtration. 37 parts of paste with 42% solids content is obtained.

The paste is dissolved in 16.5 parts of 80% formic acid by heating to 50° C. and stirring for one hour. After cooling to −2° C. and then filtering, 41.6 parts of a solution of the formate of colorant (IV) containing 0.45 mole of colorant per kg is obtained. The yield is 79%.

EXAMPLE 4

The operation is as in Example 3, except that the paranitrobenzoic acid is replaced by metanitrobenzoic acid. The same result is obtained.

EXAMPLE 5

13.8 parts of paranitrobenzoic acid are dissolved in 180 parts of water by the addition of 10.3 parts of an aqueous solution of sodium hydroxide at 35° Be. The pH of the resultant solution is adjusted to 6 by the addition of 0.9 part of propionic acid. The solution of p-nitrobenzoic acid obtained is then introduced, over one hour, into 36.4 parts of a solution of the sulfomethylate of colorant (I) containing 0.65 mole of colorant per kg. After agitating for two hours, the p-nitrobenzoate which has precipitated is isolated by filtration. 37 parts of paste with 42% solids content are obtained.

The paste is dissolved in 14 parts of propionic acid by heating to 50° C. and stirring for one hour. After cooling to −3° C. and then filtering, 40.6 parts of a solution of the propionate of colorant (IV) containing 0.45 mole of colorant per kg are obtained. The yield is 77.2%.

What is claimed is:

1. A concentrated solution of the colorant having the formula:

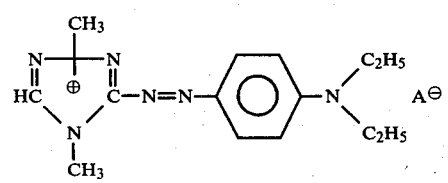

on which $A^{\ominus}$ represents the $HCOO^{\ominus}$, $CH_3COO^{\ominus}$ or $CH_3CH_2COO^{\ominus}$ anion, in a mixture of water and formic, acetic or propionic acid, said solution being substantially free from inorganic ions.

2. The solution according to claim 1 containing from 0.4 to 0.8 mole of said colorant and from 2.5 to 9 moles of formic, acetic or propionic acid per kg of solution.

3. The solution according to claims 1 or 2 containing also a member selected from the group consisting of another aliphatic carboxylic acid, an aliphatic alcohol, a coloring or printing additive and mixtures thereof.

4. A process for preparing the solution according to claim 1 which comprises treating a concentrated aqueous solution of the colorant having the formula:

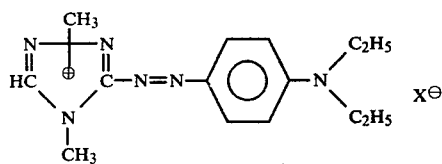

in which $X^\ominus$ is a chloride or sulfomethylate anion, with an aqueous solution of m- or p-nitrobenzoic acid, isolating the corresponding m- or p-nitrobenzoate which is formed and then dissolving said nitrobenzoate in formic, acetic or propionic acid and separating the m- or p-nitrobenzoic acid which has precipitated.

5. The process as claimed in claim 4 which comprises treating said concentrated solution of colorant with an aqueous solution of m- or p-nitrobenzoic acid, filtering the nitrobenzoate which is formed, dissolving the paste of nitrobenzoate obtained thereby in the formic, acetic or propionic acid and eliminating the precipitate of nitrobenzoic acid by filtration.

6. The process as claimed in claim 5 wherein p-nitrobenzoic acid is used.

7. The process as claimed in claims 5 or 6 which comprises using the sulfomethylate of said colorant.

8. The process as claimed in claim 5 wherein the aqueous solution of nitrobenzoic acid contains from 30 to 120 and preferably from 50 to 100 grams of acid per liter of water, the solution of colorant contains from 0.5 to 1.1 mole and preferably from 0.7 to 1 mole of colorant per kg of solution and the quantity of nitrobenzoic acid used per mole of colorant is between 0.4 and 1 kg and preferably between 0.5 and 0.8 kg.

9. The process as claimed in claim 5 wherein the nitrobenzoate paste contains between 30 and 60% and preferably between 40 and 50% by weight of solids.

10. The process claimed in claims 5 or 8 wherein the nitrobenzoic acid is dissolved in water by the addition of sodium hydroxide and the pH of that solution is adjusted to about 6.

11. The process as claimed in claims 5, 8 or 9 wherein the dissolving of the nitrobenzoate in the formic, acetic or propionic acid is accomplished by heating to a temperature lower than 60° C. and then cooling the mixture to a temperature between −5° and +5° C.

12. The process as claimed in claim 11 wherein from 5 to 18 moles and preferably 8 to 12 moles of formic, acetic or propionic acid are used per mole of colorant.

13. The process as claimed in claims 5, 8 or 9 wherein from 5 to 18 moles and preferably 8 to 12 moles of formic, acetic or propionic acid are used per mole of colorant.

* * * * *